US006578810B2

(12) United States Patent
Eguchi et al.

(10) Patent No.: US 6,578,810 B2
(45) Date of Patent: Jun. 17, 2003

(54) SEAT SLIDE APPARATUS

(75) Inventors: Moriyuki Eguchi, Kozono (JP); Ryo Fujimoto, Kozono (JP)

(73) Assignee: Johnson Controls Automotive Systems Corporation, Ayase (JP)

( * ) Notice: Subject to any disclaimer, the term of this patent is extended or adjusted under 35 U.S.C. 154(b) by 0 days.

(21) Appl. No.: 09/954,824

(22) Filed: Sep. 18, 2001

(65) Prior Publication Data

US 2002/0036254 A1 Mar. 28, 2002

(30) Foreign Application Priority Data

Sep. 25, 2000 (JP) .................................... 2000-290638

(51) Int. Cl.⁷ .............................................. F16M 13/00
(52) U.S. Cl. .................... 248/430; 248/424; 248/429
(58) Field of Search ................ 248/430, 424, 248/429

(56) References Cited

U.S. PATENT DOCUMENTS

| 4,511,187 A | 4/1985 | Rees | |
|---|---|---|---|
| 4,533,107 A | 8/1985 | Okazaki et al. | 248/430 |
| 4,602,758 A | * 7/1986 | Mann et al. | 248/430 |
| 4,621,784 A | 11/1986 | Kaesling et al. | 248/419 |
| 4,809,939 A | 3/1989 | Matsushima et al. | 248/393 |
| 5,046,698 A | 9/1991 | Venier | |
| 5,048,787 A | 9/1991 | Saitoh | 248/430 |
| 5,137,244 A | * 8/1992 | Negi | 248/429 |
| 5,192,045 A | 3/1993 | Yamada et al. | 248/430 |
| 5,213,300 A | 5/1993 | Rees | 248/429 |
| 5,522,665 A | 6/1996 | Baloche et al. | 296/65.13 |
| 5,582,381 A | 12/1996 | Graf et al. | 248/430 |
| 5,692,839 A | 12/1997 | Rohee et al. | 384/47 |
| 6,116,561 A | 9/2000 | Christopher | |
| 6,152,415 A | 11/2000 | Seki et al. | 248/430 |
| 6,189,852 B1 | * 2/2001 | Hopley et al. | 248/429 |
| 6,220,642 B1 | 4/2001 | Ito et al. | 248/429 |
| 6,416,130 B2 | 7/2002 | Yamada et al. | 297/344.11 |
| 6,422,526 B1 | 7/2002 | Ishikawa et al. | |
| 6,435,465 B1 | 8/2002 | Yamada et al. | 248/429 |
| 6,497,397 B2 | 12/2002 | Fujimoto et al. | |
| 2001/0006209 A1 | * 7/2001 | Yoshida et al. | 248/429 |
| 2001/0013570 A1 | * 8/2001 | Yoshida et al. | 248/429 |
| 2001/0015401 A1 | * 8/2001 | Yoshida et al. | 248/430 |
| 2002/0008183 A1 | 1/2002 | Mallard et al. | |
| 2002/0056798 A1 | * 5/2002 | Eguchi et al. | 248/429 |

FOREIGN PATENT DOCUMENTS

| DE | 41 33 509 | 4/1993 |
|---|---|---|
| DE | 196 48 170 | 7/1997 |
| EP | 0 922 606 | 6/1999 |
| EP | 1 116 623 A2 | 7/2001 |
| EP | 1 116 624 A2 | 7/2001 |
| JP | 07-164933 | 6/1995 |
| JP | 07-215105 | 8/1995 |

* cited by examiner

Primary Examiner—Leslie A. Braun
Assistant Examiner—Ingrid Weinhold
(74) Attorney, Agent, or Firm—Foley & Lardner

(57) ABSTRACT

Roller receiving steps (12f) are formed in both sides of a bottom portion of a main body portion (12a) in a long lower rail (12). An upper rail (13) is formed by a main body portion (13a) and a vertical wall (13e) protruding upward from a center of an upper wall (13d) and protruding upward from an opening portion (12e). A roller (27) is inserted to a portion between the step (12f) in the bottom portion of the main body portion (12a) and the upper wall (13d) of the main body portion (13a) in the upper rail (13). Circular arc surfaces (27d) are formed in both side portions (27a) of the roller (27). The circular arc surfaces (27d) in both side portions (27a) of the roller (27) are mounted to circular arc surfaces (28) of the steps (12f).

9 Claims, 4 Drawing Sheets

SEAT SLIDE APPARATUS

CROSS REFERENCE TO RELATED APPLICATION

This application claims benefit of priority under 35 USC 119 based on Japanese Patent Application P2000-290638 filed Sep. 25, 2000, the entire contents of which are incorporated by reference herein.

BACKGROUND OF THE INVENTION

1. Field of the Invention

The present invention relates to a seat slide apparatus comprising a long lower rail mounted on a floor surface for mounting a seat in a longitudinal direction, and an upper rail slidably supported so as to be guided on the long lower rail in a longitudinal direction and mounted and fixed to a seat main body side.

2. Description of the Related Art

Generally, a seat for a vehicle is provided with a seat main body constituted by a seat cushion, a seat back rotatably stood at the rear thereof, and the like. The structure is made such that the seat can be slidably adjusted in a longitudinal direction of a vehicle body by supporting the seat cushion of the like constituting the seat main body on the vehicle floor surface via a longitudinal slide mechanism, thereby capable of variously changing a layout of the seat within a passenger's room.

Further, as the longitudinal slide mechanism for the seat, there is employed a seat slide apparatus comprising a long lower rail formed in a longitudinal direction in a vehicle body floor surface side, mounted on the vehicle body floor surface side and provided so as to have substantially the same height as a surface of a floor carpet, and an upper rail mounted and fixed to a seat main body side.

As shown in FIGS. 1 and 2, in the proposed seat slide apparatus 1, each of a pair of right and left lower rails 2 is provided with a main body portion 2a formed by a metal plate member and having a substantially upward U shape, and a pair of right and left engaging portions 3 inward bent from front end sides of both side portions 2b in the main body portion 2a and having downward suspended front end sides, whereby an opening portion 3a is formed in an end portion of the engaging portion 3.

A pair of upper rails 5 of the seat slide apparatus 1 are formed in a substantially inverted-T shape so as to be assembled in the lower rails 2, and engaged portions are formed in both side portions bent upward from the front end sides of the horizontal portions of the upper rails 5. The engaged portions are engageably combined with the engaging portions 3 in a side of the lower rails 2.

Further, a vertical portion formed in an inverted-T shape in the upper rail 5 protrudes upward from the opening portion 3a of the lower rail 2, and an anchor member, a shaft of a seat lifter, a base of a reclining mechanism and the like are mounted thereto. A roller 7 is inserted to a portion between the lower arm 2 and the upper rail 5 in a state of being supported by a roller shaft 7a.

When the roller 7 is interposed between the lower rail 2 and the upper rail 5 so as to be slidably supported, it is possible to prevent at some level problems that a slide resistance is rapidly increased or reduced, a malfunction is generated due to a change of the sliding resistance caused by a noise or a load at a time of starting, and the like, in comparison with a conventional structure in which the slide mechanism is obtained by a simple sliding motion between metal surfaces.

However, in the case that the proposed seat slide apparatus 1 mentioned above is long formed, it is complicated to work respective parts, there is a problem that a play is generated due to an error of size in the respective portions or the like, and there has a disadvantage that a dispersion of size in the respective portions of the vehicle and the seat can not be absorbed. Accordingly, there has a risk that a slide operating force is increased and a smooth slide motion of the upper rail 5 can not be obtained when an inclination is generated in the roller 7 between the lower rail 2 and the upper rail 5 as shown in FIG. 2.

SUMMARY OF THE INVENTION

An object of the present invention is to provide a seat slide apparatus satisfied with below effects:

(1) The seat slide apparatus can improve the strength of a long lower rail.
(2) The seat slide apparatus can prevent a deformation of an upper rail.
(3) The seat slide apparatus can form an opening portion of the long lower rail so as to prevent dusts on a floor surface from dropping down within the lower rail from the opening portion of the lower rail.
(4) The seat slide apparatus can have a simple structure and require no additional new parts or installing operation.
(5) The seat slide apparatus can have an inexpensive cost.
(6) The seat slide apparatus can rapidly perform a mounting operation.
(7) The seat slide apparatus can obtain a smooth and stable sliding motion.
(8) The seat slide apparatus can reduce a frictional resistance, so as to improve the performance of an operation thereof.

The first aspect of the invention provides A seat slide apparatus comprising: a long lower rail mounted on a floor surface for mounting a seat in a longitudinal direction; and an upper rail supported in such a manner as to be slidably guided in a longitudinal direction on the long lower rail and mounted and fixed to a seat main body side, wherein the long lower rail is provided with a main body portion having a substantially upward U shape, and a pair of right and left upper side portions inward extended from front end sides of both side portions of the main body so as to form an opening portion, and roller receiving step are formed in both sides of a bottom portion of the main body portion, wherein the upper rail has a main body portion having a substantially downward U shape in such a manner as to be assembled in the long lower rail, and a vertical wall protruding upward from a center of an upper wall of the main body portion and protruding upward from an opening portion of the upper side portion in the long lower rail, wherein a roller is inserted to a portion between the step of the bottom portion of the main body portion in the long lower rail and the upper wall of the main body portion in the upper rail, circular arc surfaces are formed in both side portions of the roller, and the both side portions of the roller are mounted to the step of the bottom portion of the main body portion in the long lower rail, and wherein a circular arc surfaces are formed of the roller receiving step in the long lower rail, and the circular arc surfaces of the roller and the circular arc surfaces of the roller receiving step in the long lower rail are in surface contact with each other.

The second aspect of the invention provides a seat slide apparatus according to the first aspect of the invention, wherein a first slider receiving portion is formed in a lower surface side of the upper side portion in the long lower rail, and a second slider portion is formed in an upper wall of the main body portion in the upper rail, and wherein a slider is inserted to a portion between the first slider receiving portion and the second slider receiving portion.

The third aspect of the invention provides a seat slide apparatus according to the first aspect of the invention, wherein the both side portions of the roller are formed so as to have a larger diameter than that of a center portion.

The fourth aspect of the invention provides a seat slide apparatus according to the first aspect of the invention, wherein a clearance is provided between an end portion of the roller and side walls of the main body portion in the upper rail, and a washer is provided in the clearance in such a manner as to be inserted to the end portion of the roller.

The fifth aspect of the invention provides a seat slide apparatus according to the first aspect of the invention, wherein first hooks are formed in front end portions in a side of an opening portion of the main body portion in the long lower rail, and second hooks are formed in both side portions of the main body portion, respectively.

The sixth aspect of the invention provides a seat slide apparatus according to the fifth aspect of the invention, wherein first engaging portions engaged with the first hooks are respectively formed in upper walls of the main body portion in the upper rail, and second engaging portions engaged with the second hooks are respectively formed in front end sides of both side portions of the main body portion in the upper rail.

DESCRIPTION OF THE PREFERRED EMBODIMENTS

Figure 1:
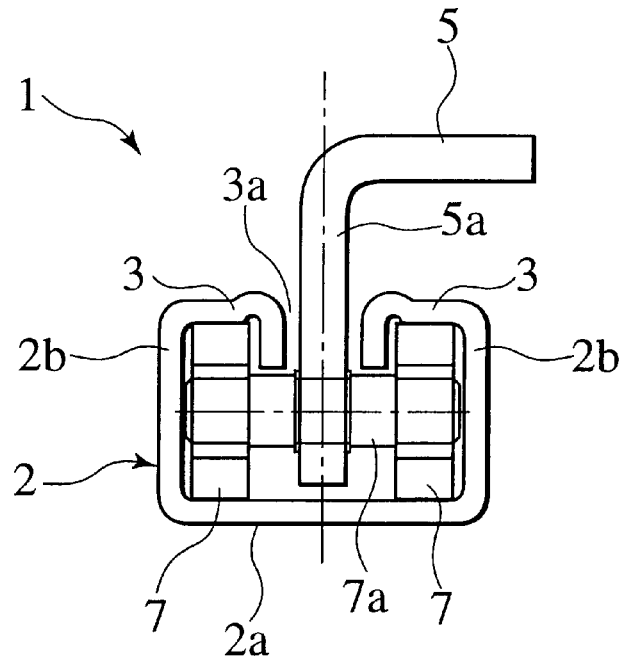
FIG. 1 is a cross sectional view of a proposed seat slide apparatus.
Figure 2:
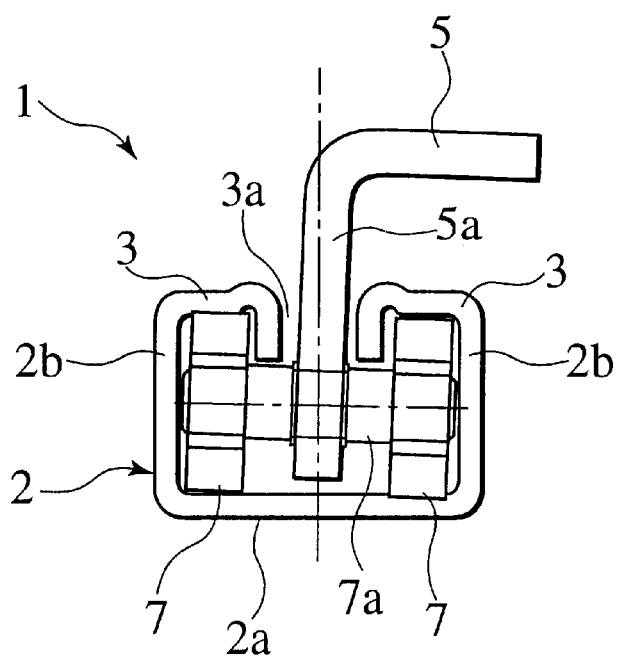
FIG. 2 is a cross sectional view showing a state that a roller of the proposed seat slide apparatus is inclined.

A description will be in detail given below a seat slide apparatus in accordance with the present invention with reference to the accompanying drawings.

A seat slide apparatus 11 is interposed between a seat main body constituted by a seat cushion, a seat back and the like and a vehicle body floor surface, and it is a well-known matter that the seat slide apparatus 11 is used for slidably supporting the seat main body in a longitudinal direction of a seat.

The seat slide apparatus 11 is provided with a long lower rail 12 mounted on the floor surface for mounting the seat in a longitudinal direction, and an upper rail 13 supported on the long lower rail 12 so as to be freely guided in a longitudinal direction and mounted and fixed to the seat main body side. The seat slide apparatus 11 is formed by extrusion molding a light alloy such as an aluminum die casting, a magnesium alloy or the like. Alternatively, the seat slide apparatus may be constituted by a hard synthetic resin product. The long lower rail 12 may be provided in a state of being buried in a notch portion of the floor carpet or used with having legs.

The long lower rail 12 is provided with a main body portion 12a having a substantially upward U shape, a pair of right and left upper side portions 12d bent inward and extended from front end sides of both side portions 12b in the main body portion 12a so as to form an opening portion 12e, and slider receiving portions 12c formed inside outer front ends of a pair of right and left upper side portions 12d. Roller receiving steps 12f are formed in both sides of a bottom portion of the main body portion 12a.

The upper rail 13 is provided with a main body portion 13a having a substantially downward U shape to be assembled in the long lower rail 12, slider receiving portions 13c formed in outer upper portions of both side portions 13b of the main body portion 13a, and a vertical wall 13e upward protruding from a center of upper walls 13d of the main body portion 13a and protruding upward from the opening portion 12e of the upper side portions 12d of the long lower rail 12. A latch 32 and an interlock member 33 corresponding to a lock mechanism are provided between the upper rail 13 and the long lower rail 12.

Figure 3:
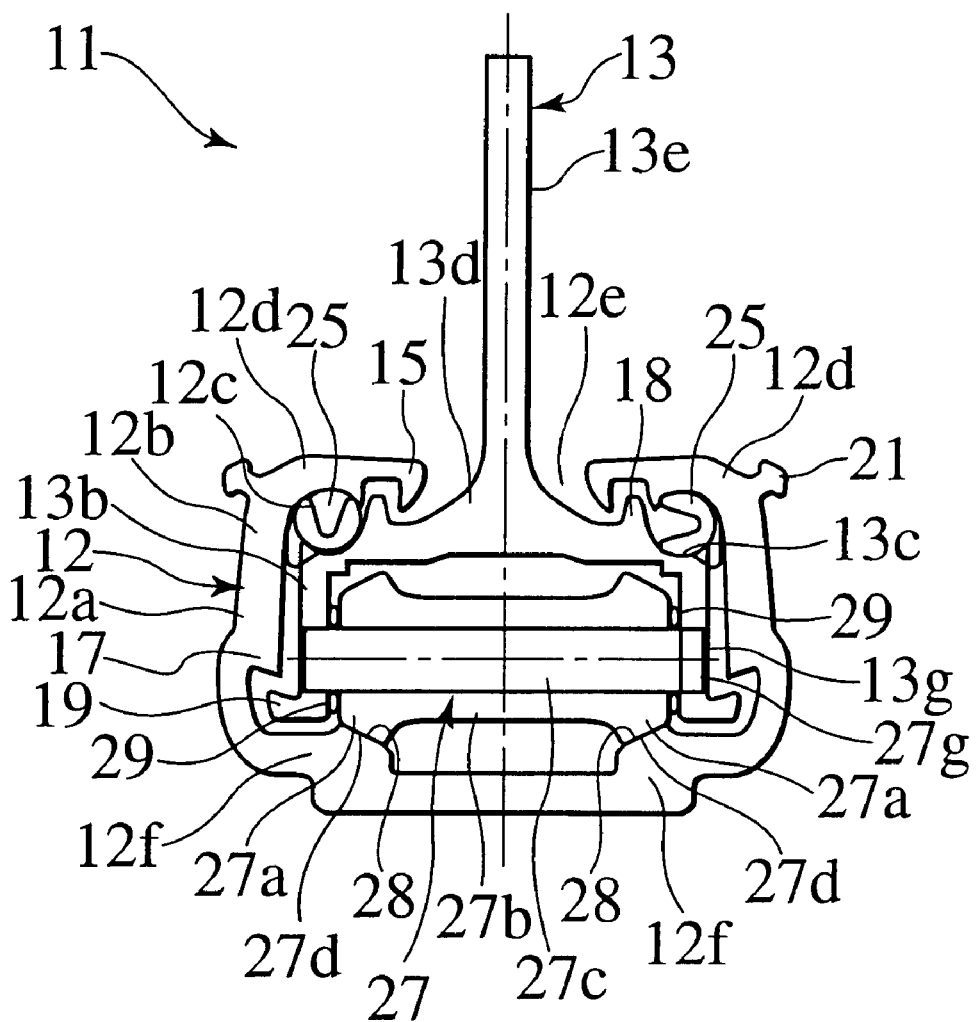
FIG. 3 is a cross sectional view at a main portion of a seat slide apparatus in accordance with the present invention.
Figure 4:
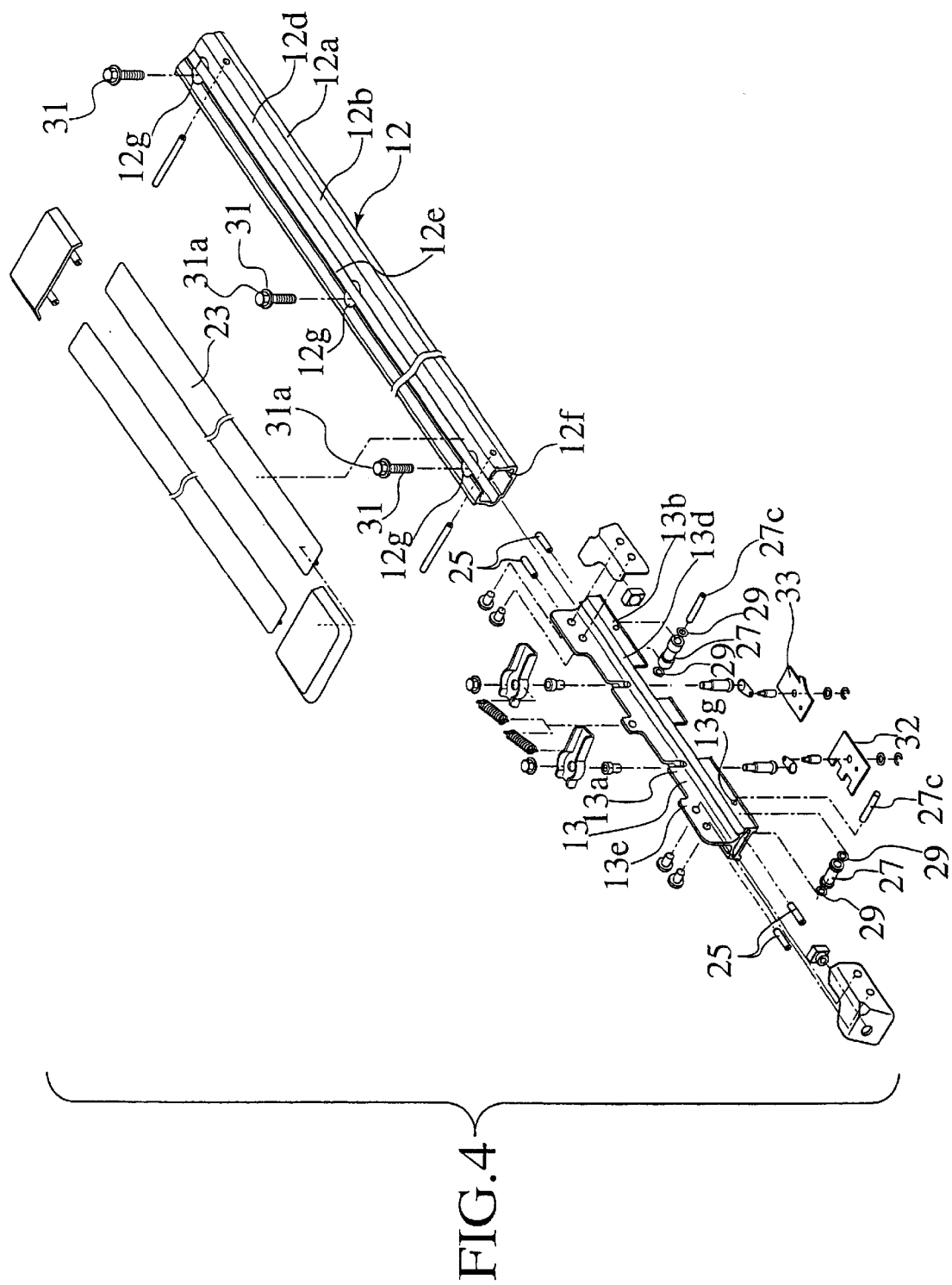
FIG. 4 is an exploded perspective view of the seat slide apparatus in accordance with the present invention.
Figure 5:
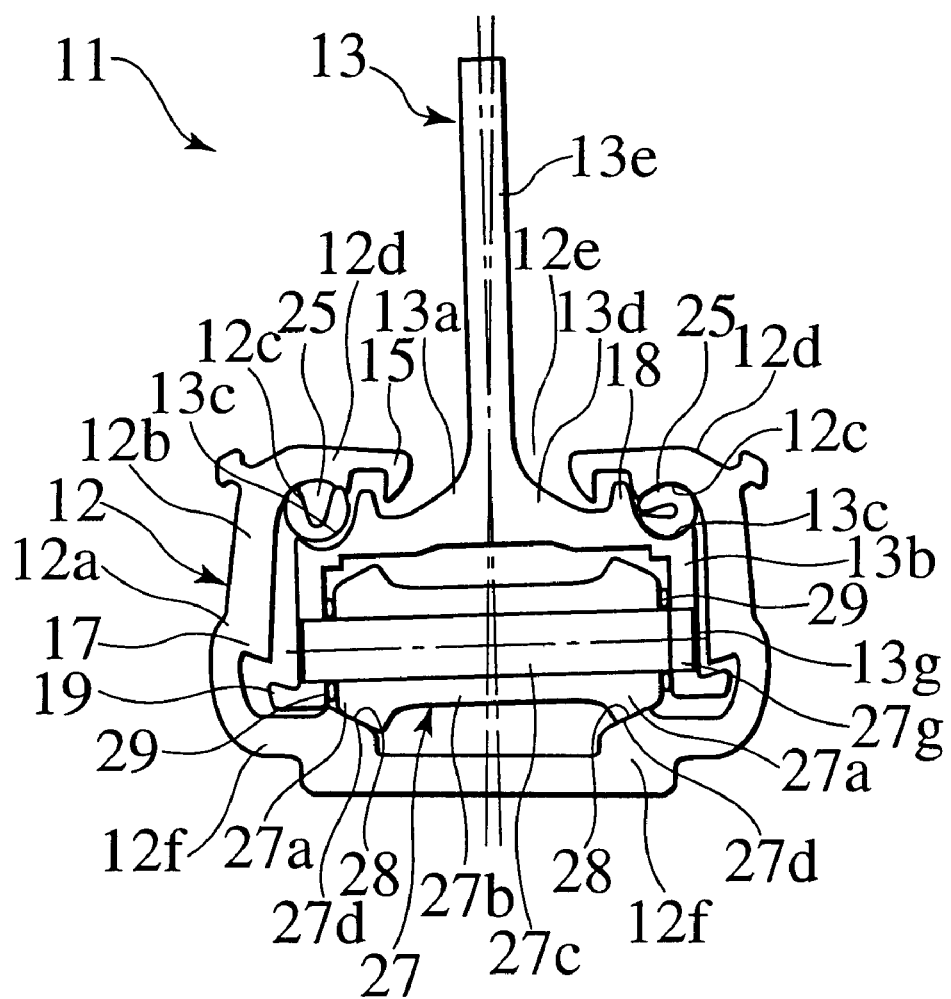
FIG. 5 is a cross sectional view of a main portion showing a state that a play is absorbed in the seat slide apparatus in accordance with the present invention.

As shown in FIG. 3, first hooks 15 are formed in front end portions in a side of the opening portion 12e of the main body portion 12a in the long lower rail 12, and second hooks 17 are formed in both side portions 12b of the main body portion 12a, respectively. Further, finisher mounting portions 21 are formed near connection portions between upper ends of both side portions 12b in the upper portions of the long lower rail 12 and a pair of right and left upper side portions 12d so as to be protruded obliquely upward. Finishers 23 formed by a synthetic resin are mounted to the finisher mounting portions 21, as shown in FIG. 4.

First engaging portions 18 engaged with the first hooks 15 of the long lower rail 12 are respectively formed in the upper walls 13d of the main body portion 13a in the upper rail 13, as shown in FIG. 3. Second engaging portions 19 engaged with the second hooks 17 of the long lower rail 12 are respectively formed in the front end sides of both side portions 13b of the main body portion 13a in the upper rail 13.

Resilient sliders 25 are inserted into portions between the slider receiving portions 12c of the long lower rail 12 and the slider receiving portions 13c in the upper rail 13. The sliders 25 are formed by a synthetic resin material or the like, and the resiliency of the sliders 25 can be obtained by forming a slit such as a V-shaped groove or the like in a longitudinal direction.

Since the sliders 25 are positioned at upper ends of both side portions 13b of the main body portion 13a in the upper rail 13, it is possible to reduce a frictional resistance in a vertical direction and a lateral direction. A roller 27 is inserted into portion between the steps 12f in the bottom portion of the main body portion 12a in the long lower rail 12 and the upper walls 13d of the main body portion 13a in the upper rail 13. The roller 27 is mounted to a roller shaft 27c. A serration 27g is formed at one end of the roller shaft 27c and the serration 27g is inserted to and engaged with a transparent hole 13g formed in the side portion 13b of the main body portion 13a in the upper rail 13.

The roller 27 is structured such that both side portions 27a are formed so as to have larger diameters than that of a center portion 27b. Both side portions 27a of the roller 27 are mounted on upper ends of the steps 12f in the bottom portion of the main body portion 12a in the long lower rail 12, whereby it is possible to secure a wide space between the center portion 27b having a small diameter and the bottom portion of the main body portion 12a in the long lower rail 12. Further, the steps 12f are formed in the bottom portion, whereby it is possible to improve the strength of the long lower rail 12.

In the case of fastening the long lower rail 12 to the floor surface by a bolt 31, since a head portion 31a of the bolt 31 exists in a wide space, there is no risk of being brought into contact with the roller 27. In this case, a circular-arc-shaped notch portion 12g capable of inserting the head portion 31a of the bolt 31 is formed in a side of the opening portion 12e of each of the upper side portions 12d in the long lower rail 12, whereby it is possible to easily fasten the long lower rail 12 by the bolt 31.

Circular arc surfaces 27d are formed in both side portions 27a of the roller 27. The circular arc surfaces 27d formed by a circular arc having a supporting point in an upper side of the vertical wall 13e corresponding to a center position in a width direction of the upper rail 13, are formed in a convex shape and are formed in both side portions 27a of the roller 27 so as to be laterally symmetrical.

Concave-shaped circular arc surfaces 28 are formed in the steps 12f of the bottom portion of the main body portion 12a in the long lower rail 12 opposing to the circular arc surfaces 27d of both side portions 27a. The circular arc surfaces 27d of the roller 27 and the circular arc surfaces 28 of the steps 12f in the long lower rail 12 are in surface contact with each other, whereby it is possible to absorb a play in a direction of incline by a rotation in the direction of incline of the upper rail 13.

Further, a clearance is provided between an end portion in a longitudinal direction of the roller 27 and an inner wall of the side portion 13b of the main body portion 13a in the upper rail 13. An elastic wave washer 29 is provided in the clearance in such a manner as to be inserted to the end portion of the roller shaft 27c. It is possible to absorb a play in a lateral direction due to a lateral movement of the upper rail 13 caused by a spring of the wave washer 29. In this case, at a time of absorbing the play in the direction of incline and the width direction, the shape of the slider 25 is deformed in a following manner.

In accordance with the structure mentioned above, if a peeling load is applied to the long lower rail 12 and the upper rail 13 from a vertical direction, the first hooks 15 and the first engaging portions 18 provided between both rails 12 and 13 are engaged with each other, and the second hooks 17 and the second engaging portions 19 are engaged with each other, whereby it is possible to temporarily obtain a peeling preventing function. Accordingly, even if the peeling load is largely applied, it is possible to easily and securely obtain a peeling prevention in a predetermined state.

In this case, the present invention is not limited to the structures in accordance with the embodiments mentioned above, and the shapes, the structures and the like of various portions in the seat slide apparatus 11 can be suitably modified and changed as occasion demands. Accordingly, in addition to the shapes and materials of the respective rails mentioned above, various kinds of modified embodiments can be considered.

What is claimed is:

1. A seat slide apparatus comprising:
   a long lower rail mounted on a floor surface for mounting a seat in a longitudinal direction; and
   an upper rail supported in such a manner as to be slidably guided in a longitudinal direction on said long lower rail and mounted and fixed to a seat main body side,
   wherein said long lower rail is provided with a main body portion having a substantially upward U shape, and a pair of right and left upper side portions inward extended from front end sides of both side portions of said main body so as to form an opening portion, and roller receiving steps are formed in both sides of a bottom portion of said main body portion,
   wherein said upper rail has a main body portion having a substantially downward U shape in such a manner as to be assembled in said long lower rail, and a vertical wall protruding upward from a center of an upper wall of said main body portion and protruding upward from an opening portion of the upper side portion in said long lower rail,
   wherein a roller is inserted into a portion between said step of said bottom portion of said main body portion in said long lower rail and said upper wall of said main body portion in said upper rail, circular arc surfaces are formed in both side portions of said roller, and said both side portions of said roller are mounted to said steps of said bottom portion of said main body portion in said long lower rail,
   wherein circular arc surfaces are formed on said roller receiving step in said long lower rail, and said circular arc surfaces of said roller and said circular arc surfaces of said roller receiving step in said long lower rail are in surface contact with each other, and
   wherein said both side portions of said roller are formed so as to have a larger diameter than that of a center portion.

2. A seat slide apparatus according to claim 1,
   wherein a first slider receiving portion is formed in a lower surface side of said upper side portion in said long lower rail, and a second slider receiving portion is formed in an upper wall of said main body portion in said upper rail,
   and wherein a slider is inserted into a portion between said first slider receiving portion and said second slider receiving portion.

3. A seat slide apparatus according to claim 1,
   wherein first hooks are formed in front end portions of said main body portion in said long lower rail, and second hooks are formed in both side portions of said main body portion in said long lower rail, respectively.

4. A seat slide apparatus comprising:
   a long lower rail mounted on a floor surface for mounting a seat in a longitudinal direction; and
   an upper rail supported in such a manner as to be slidably guided in a longitudinal direction on said long lower rail and mounted and fixed to a seat main body side,
   wherein said long lower rail is provided with a main body portion having a substantially upward U shape, and a pair of right and left upper side portions inward extended from front end sides of both side portions of said main body so as to form an opening portion, and roller receiving steps are formed in both sides of a bottom portion of said main body portion,
   wherein said upper rail has a main body portion having a substantially downward U shape in such a manner as to be assembled in said long lower rail, and a vertical wall protruding upward from a center of an upper wall of said main body portion and protruding upward from an opening portion of the upper side portion in said long lower rail,
   wherein a roller is inserted into a portion between said step of said bottom portion of said main body portion in said long lower rail and said upper wall of said main body portion in said upper rail, circular arc surfaces are formed in both side portions of said roller, and said both side portions of said roller are mounted to said steps of said bottom portion of said main body portion in said long lower rail, wherein circular arc surfaces are formed on said roller receiving step in said long lower rail, and said circular arc surfaces of said roller and said circular arc surfaces of said roller receiving step in said long lower rail are in surface contact with each other, and wherein a clearance is provided between an end portion of said roller and side walls of said main body portion in said upper rail, and a washer is provided in said clearance in such a manner as to be inserted into said end portion of said roller.

5. A seat slide apparatus according to claim 3, wherein first engaging portions engaged with said first hooks are respectively formed in upper walls of said main body portion in said upper rail, and second engaging portions engaged with said second hooks are respectively formed in front end sides of both side portions of said main body portion in said upper rail.

6. A seat slide apparatus according to claim 4, wherein a first slider receiving portion is formed in a lower surface side of said upper side portion in said long lower rail, and a second slider receiving portion is formed in an upper wall of said main body portion in said upper rail, and wherein a slider is inserted into a portion between said first slider receiving portion and said second slider receiving portion.

7. A seat slide apparatus according to claim 4, wherein said both side portions of said roller are formed so as to have a larger diameter than that of a center portion.

8. A seat slide apparatus according to claim 4, wherein first hooks are formed in front end portions of said main body portion in said long lower rail, and second hooks are formed in both side portions of said main body portion in said long lower rail, respectively.

9. A seat slide apparatus according to claim 8, wherein first engaging portions engaged with said first hooks are respectively formed in upper walls of said main body portion in said upper rail, and second engaging portions engaged with said second hooks are respectively formed in front end sides of both side portions of said main body portion in said upper rail.

* * * * *